(12) United States Patent
Karve et al.

(10) Patent No.: US 10,901,744 B2
(45) Date of Patent: Jan. 26, 2021

(54) BUFFERED INSTRUCTION DISPATCHING TO AN ISSUE QUEUE

(71) Applicant: International Business Machines Corporation, Armonk, NY (US)

(72) Inventors: Mohit S. Karve, Austin, TX (US); Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/826,741

(22) Filed: Nov. 30, 2017

(65) Prior Publication Data

US 2019/0163485 A1 May 30, 2019

(51) Int. Cl.
*G06F 9/30* (2018.01)
*G06F 9/38* (2018.01)
*G06F 9/32* (2018.01)

(52) U.S. Cl.
CPC ............ *G06F 9/3851* (2013.01); *G06F 9/321* (2013.01)

(58) Field of Classification Search
None
See application file for complete search history.

(56) References Cited

U.S. PATENT DOCUMENTS

| 5,655,096 A | 8/1997 | Branigin |
| 5,689,674 A | 11/1997 | Griffith et al. |
| 5,710,902 A | 1/1998 | Sheaffer et al. |
| 6,065,105 A | 5/2000 | Zaidi |
| 6,336,183 B1 | 1/2002 | Le et al. |
| 6,425,074 B1 | 7/2002 | Meier et al. |
| 6,463,523 B1 | 10/2002 | Kessler et al. |
| 6,553,480 B1 | 4/2003 | Cheong |
| 6,557,095 B1 | 4/2003 | Henstrom |

(Continued)

FOREIGN PATENT DOCUMENTS

| CN | 101034345 A | 9/2007 |
| CN | 102360309 A | 2/2012 |

OTHER PUBLICATIONS

Anonymously; "An extensible, scalable, optimized multithreaded data loading framework for software applications"; http://ip.com/IPCOM/000240374D; Jan. 28, 2015, 8 pages.

(Continued)

*Primary Examiner* — Corey S Faherty
(74) *Attorney, Agent, or Firm* — Cantor Colburn LLP; Jason Sosa

(57) ABSTRACT

Aspects of the invention include buffered instruction dispatching to an issue queue. A non-limiting example includes dispatching from a dispatch unit of a processor a first group of instructions selected from a first plurality of instructions to a first issue queue partition of the processor in a first cycle. A second group of instructions selected from the first plurality of instructions is passed to an issue queue buffer of the processor in the first cycle. The second group of instructions is passed from the issue queue buffer to the first issue queue partition in a second cycle. A third group of instructions selected from a second plurality of instructions is dispatched to a second issue queue partition in the second cycle.

17 Claims, 10 Drawing Sheets

(56) References Cited

U.S. PATENT DOCUMENTS

| | | | |
|---|---|---|---|
| 6,728,866 | B1 | 4/2004 | Kahle et al. |
| RE38,599 | E | 9/2004 | Tremblay |
| 6,931,639 | B1 | 8/2005 | Eickemeyer |
| 6,988,183 | B1 | 1/2006 | Wong |
| 6,988,186 | B2 | 1/2006 | Eickemeyer et al. |
| 7,133,925 | B2 | 11/2006 | Mukherjee et al. |
| 7,219,249 | B1 | 5/2007 | Ghose |
| 7,464,253 | B2 | 12/2008 | Veidenbaum et al. |
| 7,472,258 | B2 | 12/2008 | Burky |
| 7,689,812 | B2 | 3/2010 | Abernathy et al. |
| 8,127,116 | B2 | 2/2012 | Islam et al. |
| 8,285,974 | B2 | 10/2012 | Singh et al. |
| 8,392,672 | B1 | 3/2013 | Rhoades et al. |
| 8,521,998 | B2 | 8/2013 | Albernathy et al. |
| 8,667,260 | B2 | 3/2014 | Eichenberger et al. |
| 8,930,432 | B2 | 1/2015 | Hickey et al. |
| 9,047,079 | B2 | 6/2015 | Bruce et al. |
| 9,058,180 | B2 | 6/2015 | Golla et al. |
| 9,146,774 | B2 | 9/2015 | Busaba et al. |
| 9,158,573 | B2 | 10/2015 | Busaba et al. |
| 9,298,466 | B2 | 3/2016 | Buyuktosunoglu et al. |
| 9,489,207 | B2 | 11/2016 | Burky et al. |
| 9,513,924 | B2 | 12/2016 | Gschwind et al. |
| 9,619,383 | B2 | 4/2017 | Busaba et al. |
| 2002/0053038 | A1 | 5/2002 | Buyukosunoglu et al. |
| 2003/0069920 | A1 | 4/2003 | Melvin et al. |
| 2004/0177239 | A1 | 9/2004 | Clift et al. |
| 2004/0215938 | A1 | 10/2004 | Burky |
| 2005/0038979 | A1 | 2/2005 | Fischer et al. |
| 2005/0243734 | A1 | 11/2005 | Nemirovsky et al. |
| 2006/0095732 | A1 | 5/2006 | Tran |
| 2009/0100249 | A1 | 4/2009 | Eichenberger et al. |
| 2009/0113181 | A1 | 4/2009 | Comparan et al. |
| 2009/0276608 | A1 | 11/2009 | Shimada |
| 2010/0095087 | A1 | 4/2010 | Eichenberger et al. |
| 2010/0161942 | A1 | 6/2010 | Bishop |
| 2010/0262806 | A1 | 10/2010 | Doing |
| 2011/0153986 | A1 | 6/2011 | Alexander et al. |
| 2011/0302392 | A1 | 12/2011 | Abernathy et al. |
| 2012/0233441 | A1* | 9/2012 | Barreh .................. G06F 9/3814 712/206 |
| 2013/0205118 | A1 | 8/2013 | Buyuktosunoglu et al. |
| 2014/0351562 | A1* | 11/2014 | Spadini ................ G06F 9/3836 712/214 |
| 2015/0106595 | A1 | 4/2015 | Khot et al. |
| 2015/0220342 | A1 | 8/2015 | Glossner |
| 2016/0117172 | A1 | 4/2016 | Alexander et al. |
| 2016/0202988 | A1 | 7/2016 | Ayub et al. |
| 2017/0132010 | A1 | 5/2017 | Vasekin et al. |
| 2017/0235577 | A1 | 8/2017 | Brownscheidle |
| 2017/0344374 | A1 | 11/2017 | Friedmann |
| 2018/0232234 | A1 | 8/2018 | Alexander |
| 2020/0150969 | A1 | 5/2020 | Silberman et al. |

OTHER PUBLICATIONS

Anonymously; "Method and Apparatus for Hardware Assisted Function Shipping"; http://ip.com/IPCOM/000199436D; Sep. 3, 2010, 7 pages.

Joel A. Silberman, et al., Pending U.S. Appl. No. 15/826,734 entitled "Scalable Dependency Matrix With a Single Summary Bit in an Out-Of-Order Processor," filed Nov. 30, 2017.

Joel A. Silberman, et al., Pending U.S. Appl. No. 15/826,742 entitled "Scalable Dependency Matrix Nith Wake-Up Columns for Long Latency Instructions in an Out-Of-Order Processor," filed Nov. 30, 2017.

Joel A. Silberman, et al., Pending U.S. Appl. No. 15/826,746 entitled "Scalable Dependency Matrix With Multiple Summary Bits in an Out-Of-Order Processor," filed Nov. 30, 2017.

Joel A. Silberman, et al., Pending U.S. Appl. No. 15/826,754 entitled "Completing Coalesced Global Completion Table Entries in an Out-Of-Order Processor," filed Nov. 30, 2017.

Joel A. Silberman, et al.., Pending U.S. Appl. No. 15/826,752 entitled "Coalescing Global Completion Table Entries in an Out-Of-Order Processor," filed Nov. 30, 2017.

List of IBM Patents or Patent Applictions Treated as Related; (Appendix P), Filed Nov. 30, 2017.

Mohit Karve, et al., Pending U.S. Appl. No. 15/826,738 entitled "Head and Tail Pointer Manipulation in a First-In-First-Out Issue Queue," filed Nov. 30, 2017.

Mohit S. Karve, et al., Pending U.S. Appl. No. 15/826,740 entitled "Block Based Allocation and Deallocation of Issue Queue Entries," filed Nov. 30, 2017.

Tendler, JM. et al.; "POWER4 System microarchitecture"; IBM Corporation, IBM Research & Development; vol. 46, No. 1; Jan. 2002, 21 pages.

U.S. Appl. No. 15/826,745, filed Nov. 30, 2017, Entitled: Issue Queue With Dynamic Shifting Between Ports, First Named Inventor: Balaram Sinharoy.

Akkary et al., "Checkpoint processing and recovery: Towards scalable large instruction window processors." Microarchitecture, 2003. MICRO-36. Proceedings. 36th Annual IEEE/ACM International Symposium on. IEEE, 2003, 12 pages.

Alastruey et al. "Selection of the Register File Size and the Resource Allocation Policy on SMT Processors." Computer Architecture and High Performance Computing, 2008. SBAC-PAD'08. 20th International Symposium on. IEEE, 2008, 8 pages.

Anonymously; "System of Programmable Mode Control within an Instruction Sequencing Unit for Management of Power within a Microprocessor"; http://ip.com/IPCOM/000217762D; May 11, 2012, 2 pages.

Anonymously; "VSU/FXU Powergating"; http://ip.com/IPCOM/000216899D; Apr. 23, 2012, 2 pages.

Daniele Folegnani et al., "Energy Effective Issue Logic" ISCA '01, Proceedings of the 28th annual international symposium on Computer architechture, pp. 230-239 (Year:2001).

Duong et al., "Compiler Assisted Out-Of-Order Instruction Commit" Center for Embedded Computer Systems, University of California, Irvine (2010), 27 pages.

Ergin et al., "Increasing processor performance through early register release." Computer Design: VLSI in Computers and Processors, 2004. ICCD 2004. Proceedings. IEEE International Conference on. IEEE, 2004, 8 pages.

Herlihy et al., . Transactional memory: Architectural support for lock-free data structures. vol. 21. No. 2. ACM, 1993, 41 pages.

IBM; "Instruction Steering Policy for Balanced Utilization of a Biburcated Unified Issue Queue"; http://ip.com/IPCOM/000179961D; Mar. 3, 2009, 3 pages.

International Search Report and Written Opinion for International Application No. PCT/IB2018/058800; International Filing Date: Nov. 9, 2018; dated Feb. 27, 2019, 9 pages.

International Search Report and Written Opinion for International Application No. PCT/IB2018/058801; International Filing Date: Nov. 9, 2018; dated Jan. 21, 2019, 9 pages.

International Search Report/Written Opinion for International Application No. PCT/IB2018/058799; International Filing Date: Nov. 9, 2018; dated Feb. 12, 2019, 9 pages.

Koufaty et al., "Hyperthreading technology in the netburst microarchitecture." IEEE Micro 23.2 (2003): pp. 56-65.

Martinez et al. "Cherry: Checkpointed early resource recycling in out-of-order microprocessors." Microarchitecture, 2002.(MICRO-35). Proceedings. 35th Annual IEEE/ACM International Symposium on. IEEE, 2002, 12 pages.

Mericas, A.; "Performance Characteristics of the POWER8 Processor"; IBM Corporation, IBM Systems & Technology Group Development; 2014, 26 pages.

Ramírez et al., "Direct Instruction Wakeup for Out-Of-Order Processors," Proc Innovative Architecture for Future Generation High-Performance Processors and Systems, IEEE, 2004, 8 Pages.

Shum et al., "IBM zEC12: The third-generation high-frequency mainframe microprocessor." Ieee Micro 33.2 (2013): pp. 38-47.

Subramaniam et al., "Store Vectors for Scalable Memory Dependence Prediction and Scheduling," Proc of the 12th Intl Symp on High-Performance Computer Architecture, IEEE, 2006, 12 pages.

(56) References Cited

OTHER PUBLICATIONS

Joel A. Silberman, et al.., Pending U.S. Appl. No. 16/738,360 entitled "Coalescing Global Completion Table Entries in an Out-Of-Order Processor," filed Jan. 9, 2020.
List of IBM Patents or Patent Applictions Treated as Related; (Appendix P), Filed Jan. 23, 2020.

* cited by examiner

US 10,901,744 B2

BUFFERED INSTRUCTION DISPATCHING TO AN ISSUE QUEUE

BACKGROUND

Embodiments of the present invention relate in general to an out-of-order (OoO) processor and more specifically to buffered instruction dispatching to an issue queue.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues. Multiple instructions can be dispatched to the one or more issue queues per cycle. The one or more issue queues can be shared by one or more threads.

SUMMARY

Embodiments of the present invention include methods, systems, and computer program products for implementing buffered instruction dispatching to an issue queue. A non-limiting example of the computer-implemented method includes dispatching from a dispatch unit of a processor a first group of instructions selected from a first plurality of instructions to a first issue queue partition of the processor in a first cycle. A second group of instructions selected from the first plurality of instructions is passed to an issue queue buffer of the processor in the first cycle. The second group of instructions is passed from the issue queue buffer to the first issue queue partition in a second cycle. A third group of instructions selected from a second plurality of instructions is dispatched to a second issue queue partition in the second cycle.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
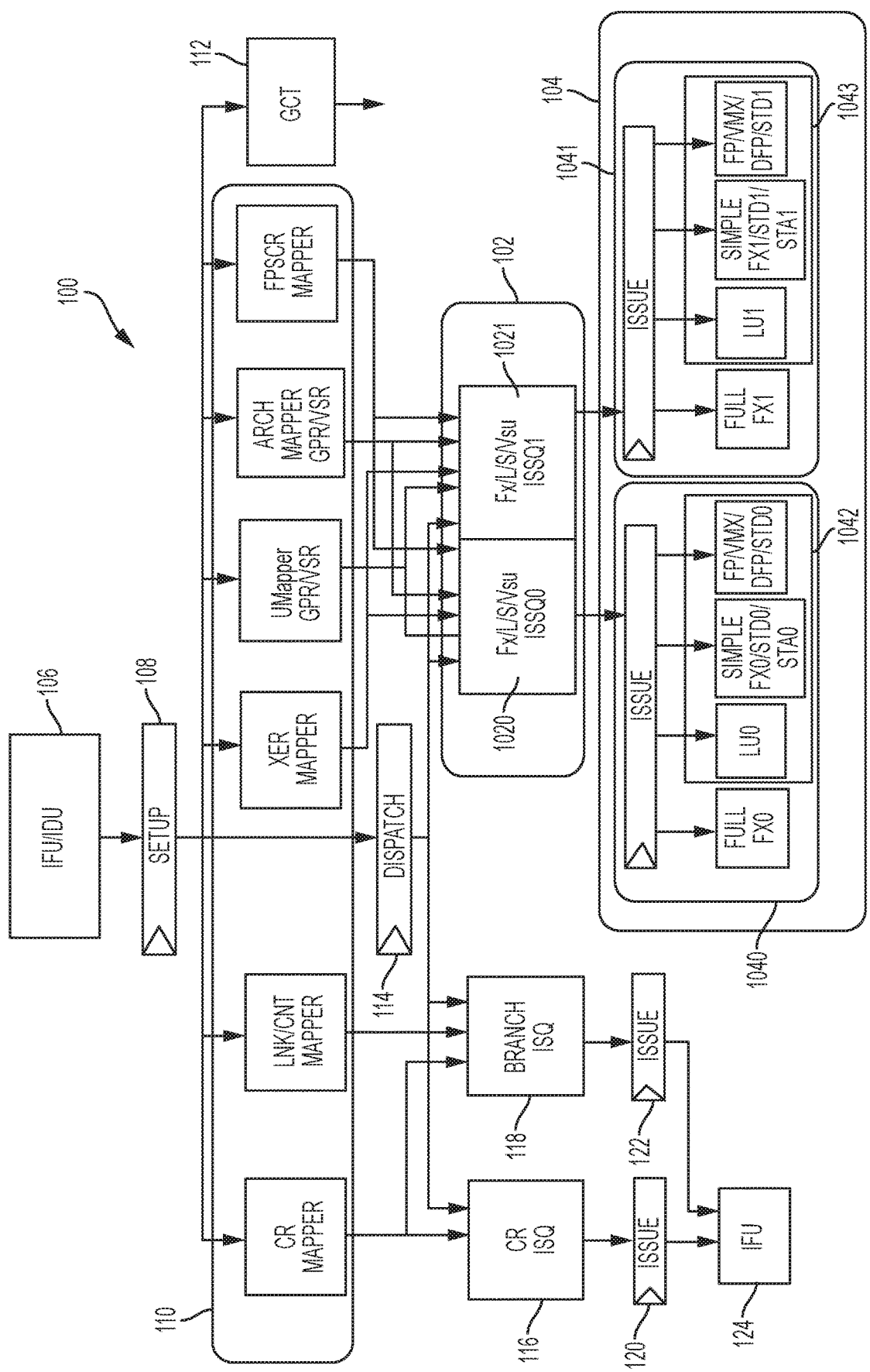
FIG. 1 depicts a block diagram of a system that includes an instruction sequencing unit (ISU) of an out-of-order (OoO) processor in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention described herein provide buffered instruction dispatching to an issue queue. In embodiments, a partitioned issue queue refers to either multiple issue queue structures collectively or to a single issue queue that is partitioned using address mapping and support logic to perform as multiple separate issue queues. A partitioned issue queue can improve performance in multithreaded operations in an OoO processor, for instance, by limiting gaps due to dependencies of instructions from one or more threads issuing out of order. Dispatching multiple instructions per cycle also improves performance but can come a cost of greater physical area and power consumption due to an increased number of write data ports typically needed to support parallel instruction dispatching. The increased number of write data ports does not scale the design linearly, as additional support logic is typically needed to manage all of the port routing options. For instance, while using four write ports per issue queue to dispatch four instructions per cycle with two issue queue partitions may be manageable, when increasing to six instructions dispatched per cycle, it may be impractical to include six write ports per issue queue partition due to larger area and power requirements.

In embodiments of the present invention, two or more issue queue partitions each have two or more write data ports. The issue queue partitioning can be used to manage two or more threads in parallel (e.g., separate execution sequences that need not be related to each other). In embodiments of the present invention, one or more issue queue buffers enable a reduction in the number of write data ports in the issue queue partitions. As one example, a dispatch unit can support dispatching of six instructions per cycle. In a single threaded mode, the six instructions can be written to two issue queue partitions with three write data ports per partition. In multithreaded mode, each issue queue partition can be written with instructions from a different thread (e.g., partitioned as thread pairs). Each issue queue partition can be written with up to six instructions in every other cycle, since the threads alternate dispatching. An issue queue buffer can be included that buffers excess instructions beyond three to support dispatching of up to six instructions for a thread to a three write data port issue queue partition. If three or fewer instructions are dispatched in a cycle, all of the instructions can be written in the appropriate issue queue partition for a thread. If more than three instructions are dispatched, all instructions beyond the first three can be buffered in the issue queue buffer. The issue queue buffer can be shared by all threads to store excess instructions. If a thread has more than three instructions dispatched, then the first three instructions can be written in the current cycle, taking directly from the dispatcher. Remaining instructions are written in the following cycle, taking from the issue queue buffer. In this approach, each issue queue partition can write in every cycle to allow each "thread set" to dispatch six instructions in alternate cycles. This supports writing six instructions per cycle in alternating cycles, where three instructions go directly to an issue queue and three are buffered for an additional cycle in the issue queue buffer in this example.

The use of issue queue buffers and issue queue partitions can be extended to various combinations. For instance, in a four thread example, six instructions can be split with a three entry issue queue buffer and two issue queue partitions with three write data ports per issue queue partition with two threads assigned to each issue queue partition. Alternatively, in a four thread example, eight instructions can be split using three issue queue buffers and four issue queue partitions with two write data ports per issue queue partition. Technical effects include using at least one issue queue buffer between a dispatch unit and one or more issue queues to buffer instructions dispatched in parallel and reduce the number of write data ports per issue queue partition to be less than the capacity of the dispatch unit to hold instructions for parallel dispatch.

Turning now to FIG. 1, a block diagram of a system 100 that includes an instruction sequencing unit (ISU) of an out-of-order (OoO) processor for implementing buffered instruction dispatching to an issue queue is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in MT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FPNMX/DFP/STD0 form a load-store unit (LSU) 1042. Similarly, the LU1, the Simple FX1/STD1/STA1, and the FP/VMX/DFP/STD1 form a load-store unit (LSU) 1043. As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
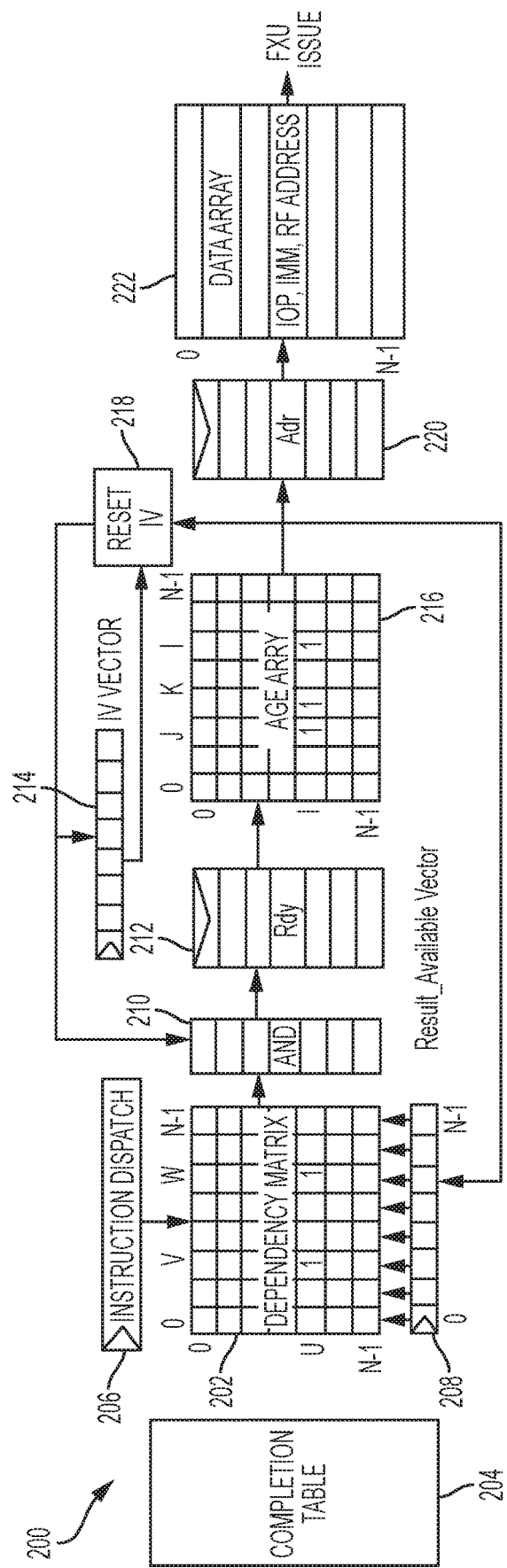
FIG. 2 depicts a block diagram of an issue queue in an ISU of an OoO processor in accordance with one or more embodiments of the present invention.

Turning now to FIG. 2, a block diagram of an issue queue 200 is generally shown according to one or more embodiments of the present invention. The issue queue 200 shown in FIG. 2 includes matrices, tables, and vectors for tracking instructions that are waiting to be issued. The matrices and tables each include a corresponding row for each instruction being tracked, and the vectors include an entry for instructions being tracked. As the number of instructions in the issue queues continues to increase, the amount of space and power taken up by each of the matrices, tables, and vectors is growing.

The issue queue 200 tracks instructions that are waiting for execution by an execution unit. An instruction is dispatched and allocated to the issue queue 200 (e.g., CR ISQ 116, Branch ISQ 118, issue queue 102). The instruction is ready to issue from the issue queue 200 when its dependencies are satisfied, that is when the instructions have issued and their corresponding results are available. The issue queue 200 issues the instruction to an execution unit (e.g., execution unit 104). After issuing the instruction, the issue queue 200 continues to track the instruction at least until the instruction passes a rejection point. The rejection point is different for different instructions and refers to the point where it is known that the instruction will not have to be reissued (e.g., in a read memory operation the rejection point can be passed once the cache is accessed for the read data). Once the instruction has passed the rejection point it can be deallocated from the issue queue and the entry in the issue queue is cleared for reuse by a new instruction. The instruction finishes once the execution of the instruction, by an execution unit, has completed.

The issue queue 200 shown in FIG. 2 includes: a dependency matrix 202 for tracking dependencies between instructions in the issue queue 200; a completion table 204 for indicating that the execution of an instruction has passed the rejection point and the instruction can be deallocated from the issue queue 200; an instruction dispatch unit 206 (e.g., dispatch unit 114 in FIG. 1) for receiving instructions to add to the issue queue; a result-available vector 208 for indicating that all of the instructions that the instruction is dependent on have issued; an IV vector 210 that indicates the instructions that are valid and issuable; AND logic 210 that logically ANDs the output of the dependency matrix with the IV vector; a ready vector 212 for indicting that the results from all of the instructions that the instruction is dependent on are available and the instruction is valid and issuable; an age array 216 for tracking the order that the instructions came into the issue queue so that when two or more instructions are ready for execution, older instruction can be selected before newer instruction; a reset IV control 218 for updating the IV state to prevent re-issue of a selected instruction or permit re-issue after rejection; an address 220 used as a read index corresponding to the instruction selected for issue; and a data array 222 containing the text of the instruction that is used by the execution unit for executing the instruction (e.g., an opcode, a pointer to a register file address, immediate data).

As shown in the dependency matrix 202 of FIG. 2 which can track N instructions that are waiting in the issue queue, an instruction at position "u" depends on the instructions at position "v" and "w". The dependency matrix 202 shown in FIG. 2 has N rows and N columns, one row and column for each instruction in the issue queue. As shown in the age array 216 of FIG. 2, instructions at positions "j", "k", and "l" are older than the instruction at position "i".

Figure 3:
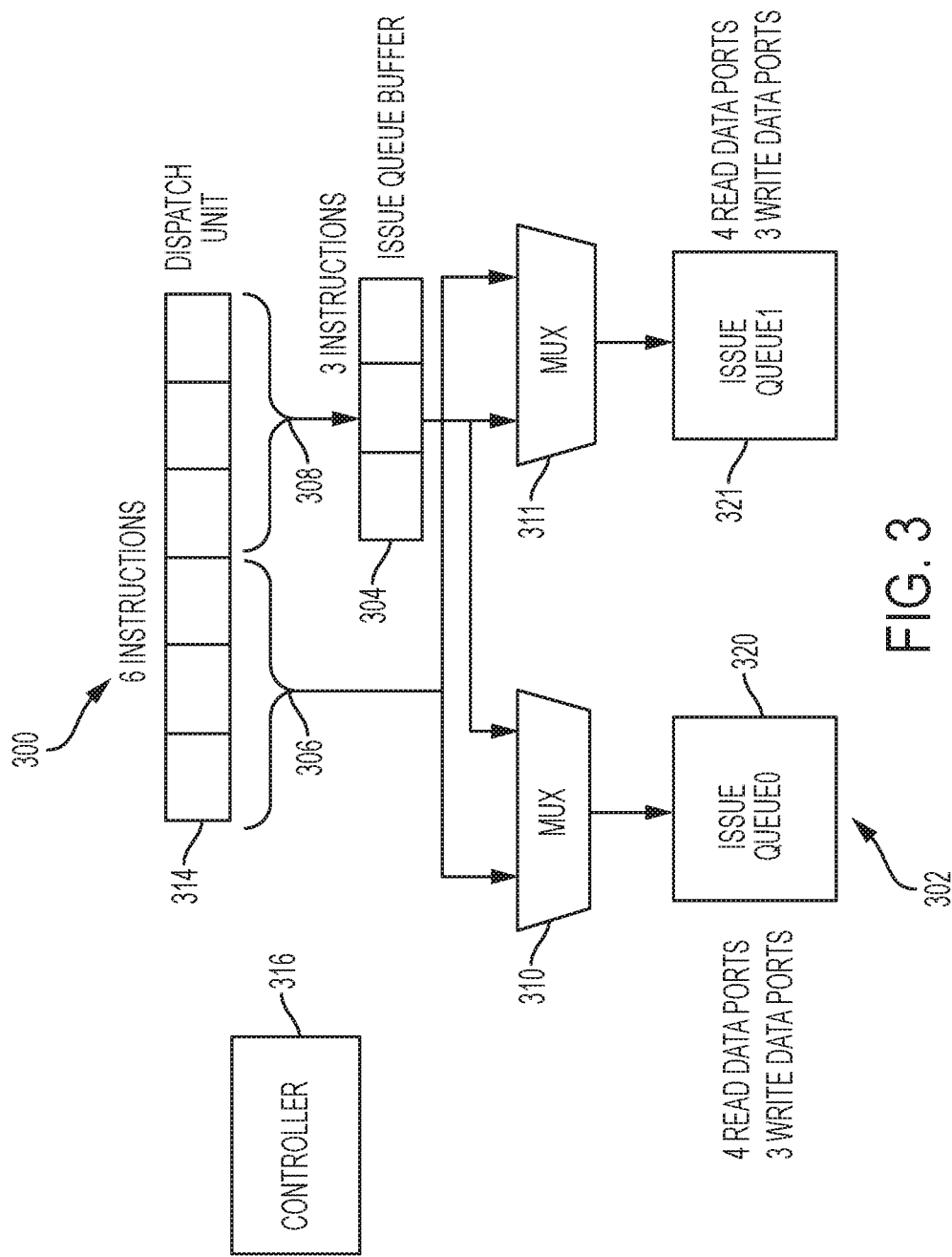
FIG. 3 depicts a block diagram of a system for buffered instruction dispatching to an issue queue in accordance with one or more embodiments of the present invention.

FIG. 3 depicts a block diagram of a system 300 for buffered instruction dispatching to an issue queue 302 in accordance with one or more embodiments of the present invention. The issue queue 302 is an embodiment of issue queue 102 of FIG. 1, including a first issue queue partition 320 and a second issue queue partition 321. The system 300 also includes dispatch unit 314 as an embodiment of dispatch unit 114 of FIG. 1 operable to dispatch six instructions in parallel. In the example of FIG. 3, an issue queue buffer 304 has a capacity to hold three instructions. A first group of instructions can be dispatched from dispatch unit 314 to either the first or second issue queue partition 320, 321 on a direct dispatch link 306, while a second group of instructions can be passed to the issue queue buffer 304 on a buffered dispatch link 308. A first multiplexer 310 determines whether the first issue queue partition 320 receives instructions from the direct dispatch link 306 or from the issue queue buffer 304. Similarly, a second multiplexer 311 determines whether the second issue queue partition 321 receives instructions from the direct dispatch link 306 or from the issue queue buffer 304. A controller 316 can make switching/routing determinations to control flow and selection of inputs to/from the first and second multiplexers 310, 311. The controller 316 can be implemented as one or more circuits operable to directly implement the functionality herein as hardware, executable instructions, or a combination thereof.

In the example of FIG. 3, each of the first and second issue queue partitions 320, 321 has three write data ports and four read data ports. Each of the first and second issue queue partitions 320, 321 can also include a write address port. Only one write address port may be needed per issue queue partition when implemented in a first-in-first-out (FIFO) format since sequential address values can be inferred by relative instruction position within a sequence of instructions prior to OoO execution of the instructions. The issue queue buffer 304 can be used to interleave dispatching of instructions between cycle boundaries. For example, if six instructions are in the dispatch unit 314 as a first plurality of instructions, during a first cycle, half of the instructions are dispatched as the first group of instructions (e.g., to the first issue queue partition 320 through the first multiplexer 310 via direct dispatch link 306) and half of the instructions are passed as the second group of instructions to issue queue buffer 304 via buffered dispatch link 308. This completely empties the six entries (i.e., full capacity) of the dispatch unit 314 in a cycle and frees up the dispatch unit 314 to receive another plurality of instructions. When a second plurality of instructions is available in the dispatch unit 314, a third group of instructions (e.g., first half of the second plurality of instructions) can be dispatched from the dispatch unit 314 to the second issue queue partition 321 through the second multiplexer 311 via direct dispatch link 306, while the second group of instructions (from the first plurality of instructions) buffered in the issue queue buffer 304 is passed to the first issue queue partition 320 through multiplexer 310 in a second cycle. Also during the second cycle, a fourth group of instructions (e.g., second half of the second plurality of instructions) can be passed from the dispatch unit 314 to the issue queue buffer 304 via buffered dispatch link 308 to be written to the second issue queue partition 321 during the next cycle. The process can continue in this way, or the controller 316 may use other control sequencing depending on the number of threads and instructions dispatched per cycle.

Figure 4:
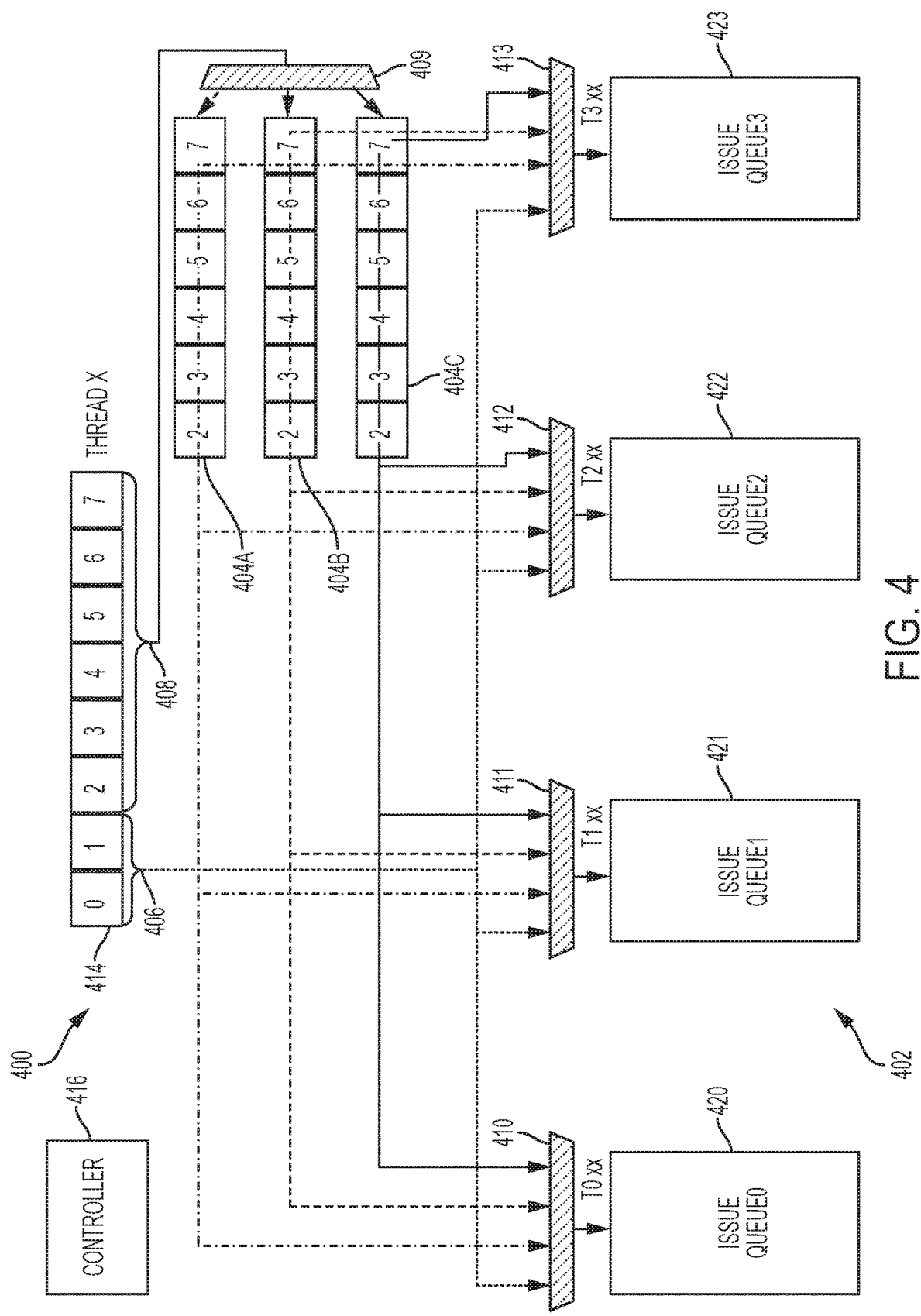
FIG. 4 depicts a block diagram of a system for multi-threaded buffered instruction dispatching to an issue queue in accordance with one or more embodiments of the present invention.

FIG. 4 depicts a block diagram of a system 400 for multithreaded buffered instruction dispatching to an issue queue 402 in accordance with one or more embodiments of the present invention. The issue queue 402 is an embodiment of issue queue 102 of FIG. 1 with additional partitions including a first issue queue partition 420, a second issue queue partition 421, a third issue queue partition 422, and a fourth issue queue partition 423. The system 400 also includes dispatch unit 414 as an embodiment of dispatch unit 114 of FIG. 1 operable to dispatch eight instructions in parallel. In the example of FIG. 4, three issue queue buffers 404A, 404B, 404C each have a capacity to hold up to six instructions. A first group of instructions can be dispatched from dispatch unit 414 to any one of the first, second, third or fourth issue queue partition 420, 421, 422, 423 on a direct dispatch link 406, while a second group of instructions can be passed to the issue queue buffers 404A-C on a buffered dispatch link 408. A buffered input multiplexer 409 can selectively route one or more instructions on the buffered dispatch link 408 to one or more of the issue queue buffers 404A-C, for example, as selected by controller 416.

A first multiplexer 410 determines whether the first issue queue partition 420 receives instructions from the direct dispatch link 406 or from one of the issue queue buffers 404A-C. Similarly, a second multiplexer 411 determines whether the second issue queue partition 421 receives instructions from the direct dispatch link 406 or from one of the issue queue buffers 404A-C. A third multiplexer 412 determines whether the third issue queue partition 422 receives instructions from the direct dispatch link 406 or from one of the issue queue buffers 404A-C. A fourth multiplexer 413 determines whether the fourth issue queue partition 423 receives instructions from the direct dispatch link 406 or from one of the issue queue buffers 404A-C. Controller 416 can make switching/routing determinations to control flow and selection of inputs to/from the multiplexers 410-413. The controller 416 can be implemented as one or more circuits operable to directly implement the functionality herein as hardware, executable instructions, or a combination thereof.

In the example of FIG. 4, each of the issue queue partitions 420-423 has two write data ports and is associated with a particular thread when operating in four-threaded mode (e.g., threads T0, T1, T2, T3). An example sequence of routing instructions in multiple cycles of system 400 is depicted in the example of FIGS. 5-8.

Figure 5:
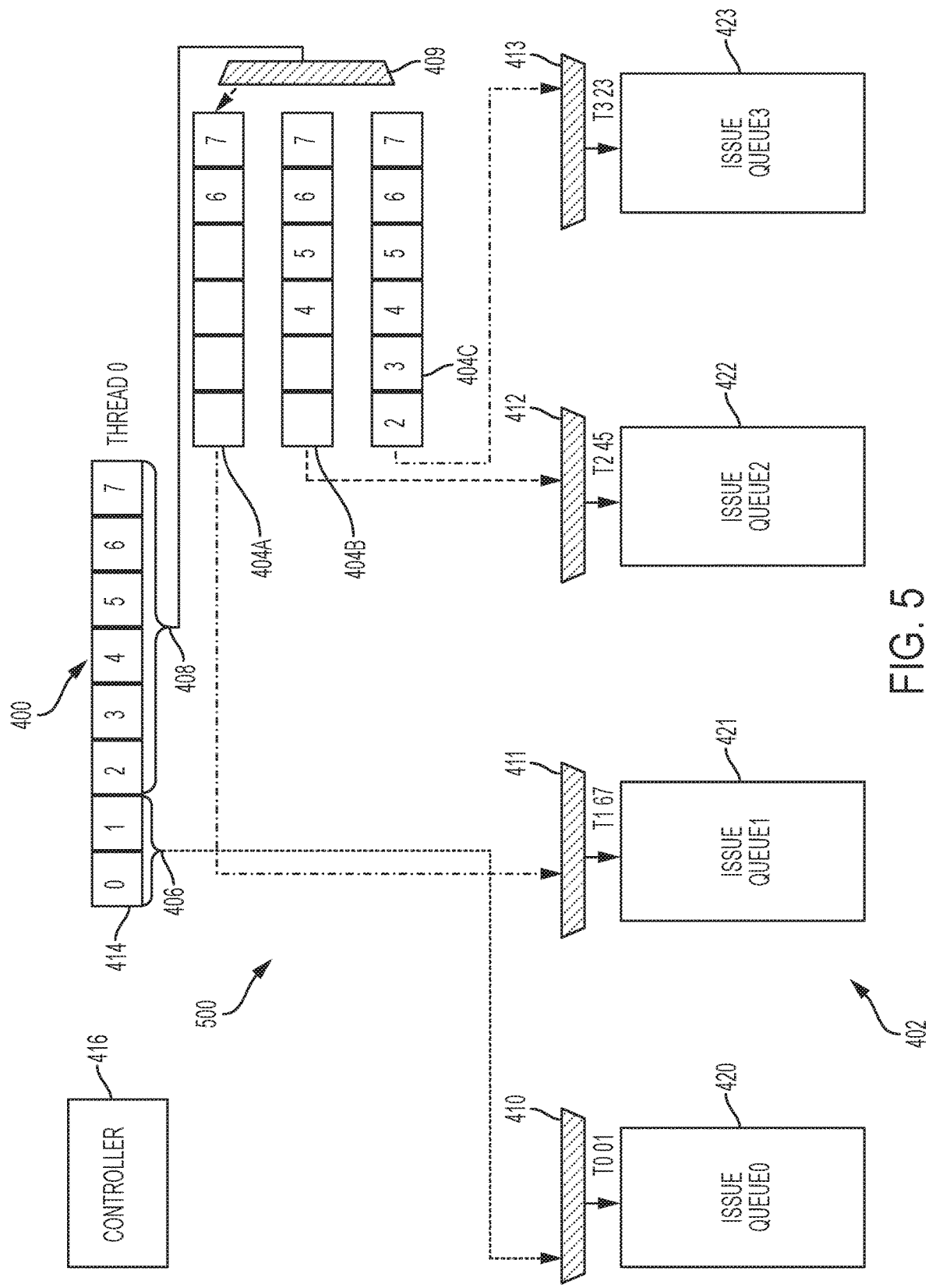
FIG. 5 depicts a first selection sequence for multithreaded buffered instruction dispatching to an issue queue in accordance with one or more embodiments of the present invention.

In FIG. 5, a first selection sequence 500 for multithreaded buffered instruction dispatching to issue queue 402 by controller 416 is depicted in accordance with one or more embodiments of the present invention. The first selection sequence 500 includes thread0 in the dispatch unit 414. In this example, eight instruction blocks from distinct instruction streams are referred to using the numbers 0-7. Here, the numbers 0-7 indicate the position of an instruction in the dispatch unit 414, with instructions 0-1 always written directly to an issue queue, while instructions 2-7 are always buffered and then written to a targeted issue queue over multiple cycles. During a cycle, instruction0 and instruction1 from dispatch unit 414 can be written via direct dispatch link 406 to the first issue queue partition 420, while the second issue queue partition 421 receives instruction6 and instruction7 from issue queue buffer 404A, the third issue queue partition 422 receives instruction4 and instruction5 from issue queue buffer 404B, and the fourth issue queue partition 423 receives instruction2 and instruction3 from issue queue buffer 404C. The issue queue buffers 404A-C can function as FIFO buffers, such that instructions passed from dispatch unit 414 can be written via buffered dispatch link 408 to which ever one of the issue queue buffers 404A-C is most nearly empty. Thus, in the example of FIG. 5, as instruction6 and instruction7 are passed out of issue queue buffer 404A, instruction2-7 of thread0 can be written from dispatch unit 414 to issue queue buffer 404A.

Figure 6:
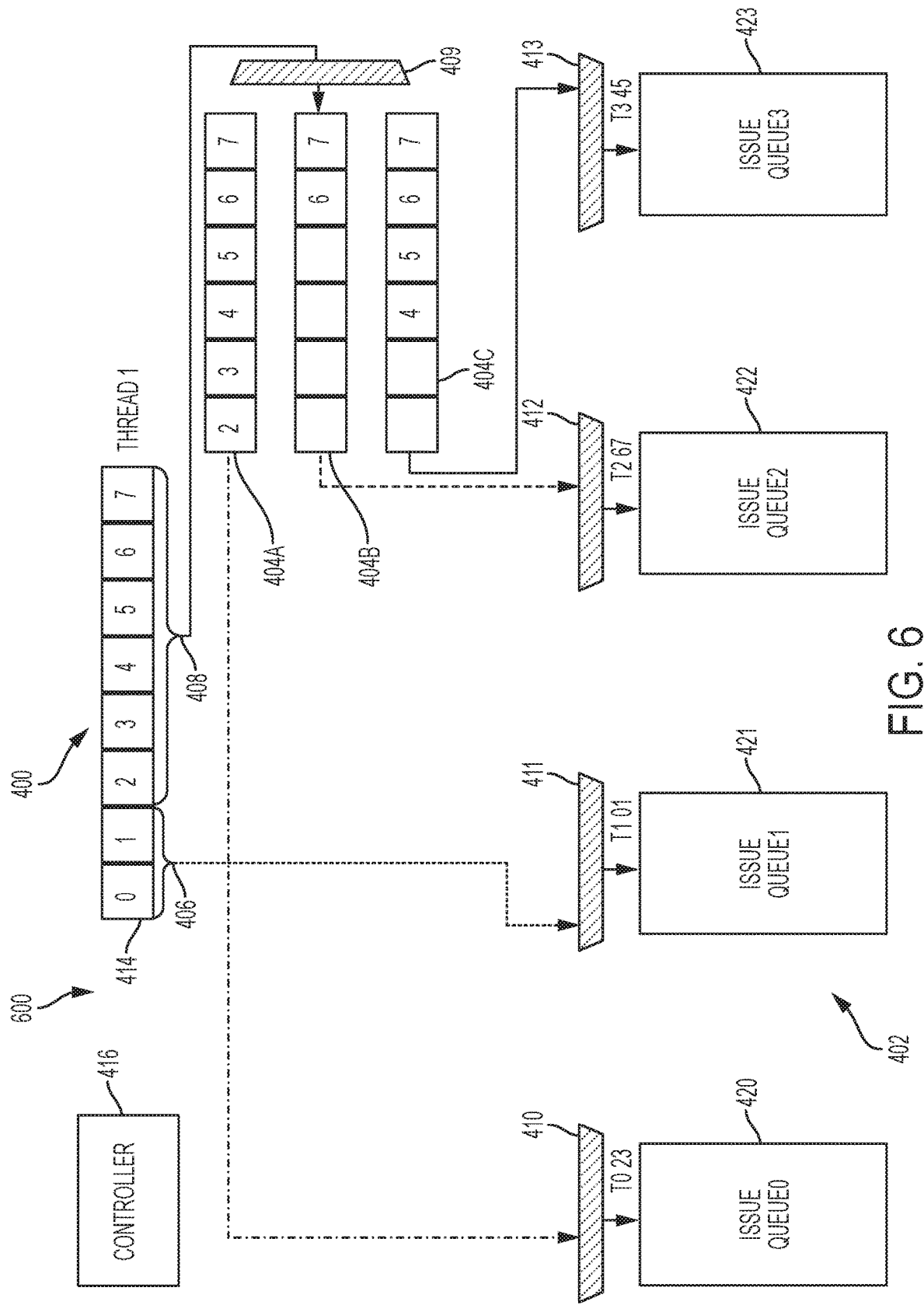
FIG. 6 depicts a second selection sequence for multi-threaded buffered instruction dispatching to an issue queue in accordance with one or more embodiments of the present invention.

In FIG. 6, a second selection sequence 600 for multithreaded buffered instruction dispatching to issue queue 402 by controller 416 is depicted in accordance with one or more embodiments of the present invention as a continuation from the first selection sequence 500 of FIG. 5. The second selection sequence 600 includes thread1 in the dispatch unit 414. During a cycle, instruction0 and instruction1 from dispatch unit 414 can be written via direct dispatch link 406 to the second issue queue partition 421, while the third issue queue partition 422 receives instruction6 and instruction7 from issue queue buffer 404B, the fourth issue queue partition 423 receives instruction4 and instruction5 from issue queue buffer 404C, and the first issue queue partition 420 receives instruction2 and instruction3 from issue queue buffer 404A.

Figure 7:
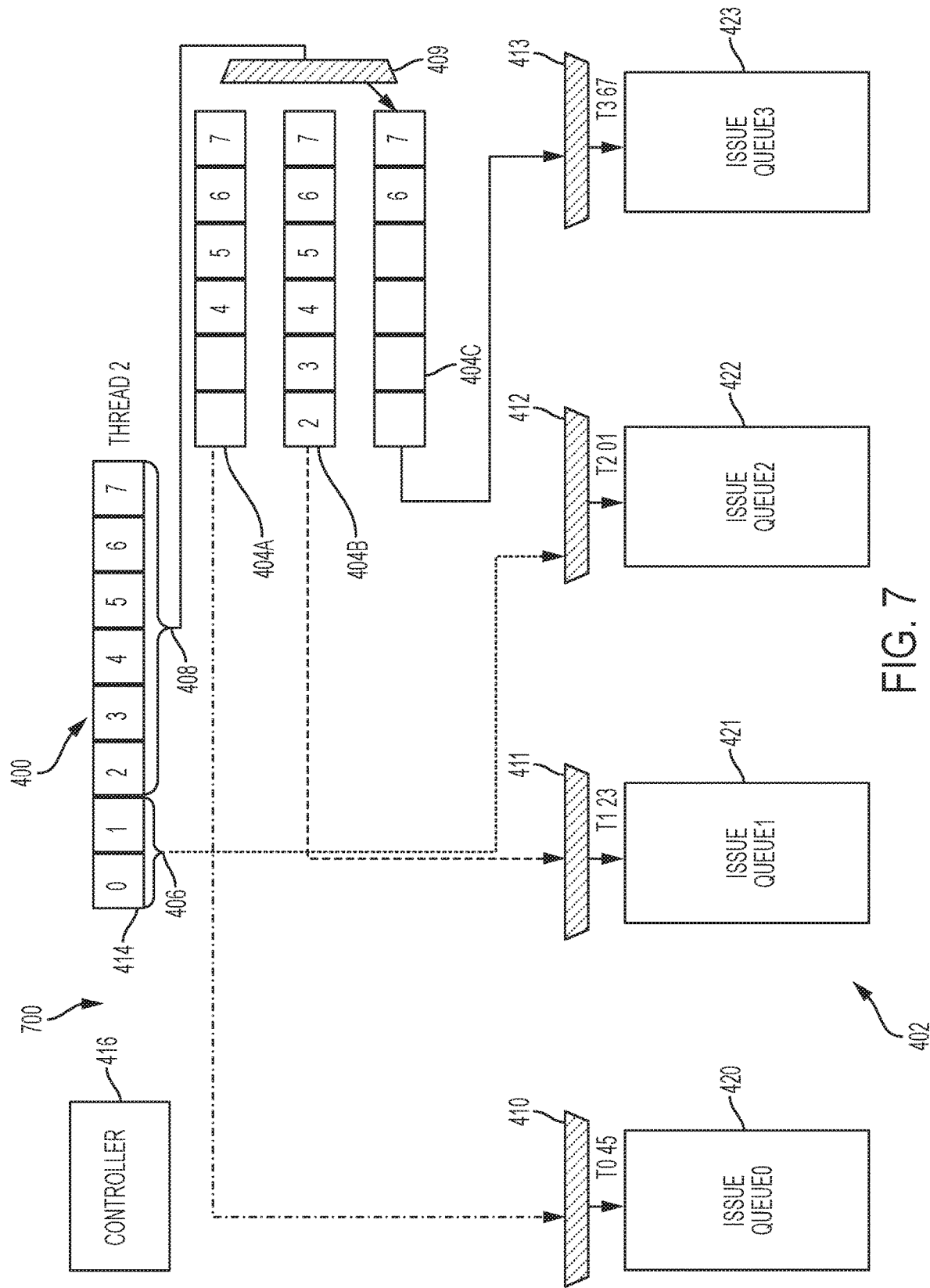
FIG. 7 depicts a third selection sequence for multi-threaded buffered instruction dispatching to an issue queue in accordance with one or more embodiments of the present invention.

In FIG. 7, a third selection sequence 700 for multithreaded buffered instruction dispatching to issue queue 402 by controller 416 is depicted in accordance with one or more embodiments of the present invention as a continuation from the second selection sequence 600 of FIG. 6. The third selection sequence 700 includes thread2 in the dispatch unit 414. During a cycle, instruction0 and instruction1 from dispatch unit 414 can be written via direct dispatch link 406 to the third issue queue partition 422, while the fourth issue queue partition 423 receives instruction6 and instruction7 from issue queue buffer 404C, the first issue queue partition 420 receives instruction4 and instruction5 from issue queue buffer 404A, and the second issue queue partition 421 receives instruction2 and instruction3 from issue queue buffer 404B.

Figure 8:
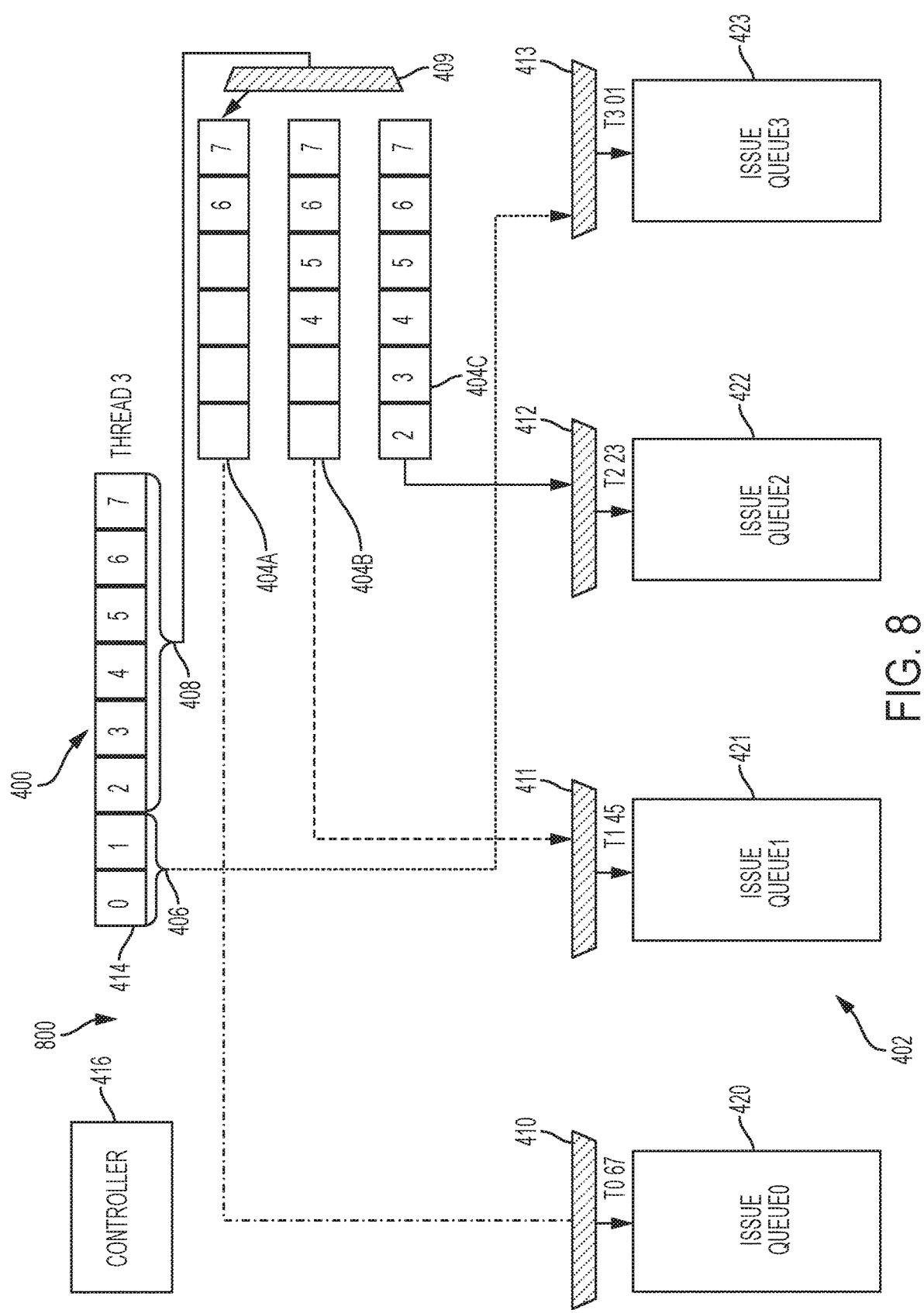
FIG. 8 depicts a fourth selection sequence for multi-threaded buffered instruction dispatching to an issue queue in accordance with one or more embodiments of the present invention.

In FIG. 8, a fourth selection sequence 800 for multithreaded buffered instruction dispatching to issue queue 402 by controller 416 is depicted in accordance with one or more embodiments of the present invention as a continuation from the third selection sequence 700 of FIG. 7. The fourth selection sequence 800 includes thread3 in the dispatch unit 414. During a cycle, instruction0 and instruction1 from dispatch unit 414 can be written via direct dispatch link 406 to the fourth issue queue partition 423, while the first issue queue partition 420 receives instruction6 and instruction7 from issue queue buffer 404A, the second issue queue partition 421 receives instruction4 and instruction5 from issue queue buffer 404B, and the third issue queue partition 422 receives instruction2 and instruction3 from issue queue buffer 404C.

Figure 9:
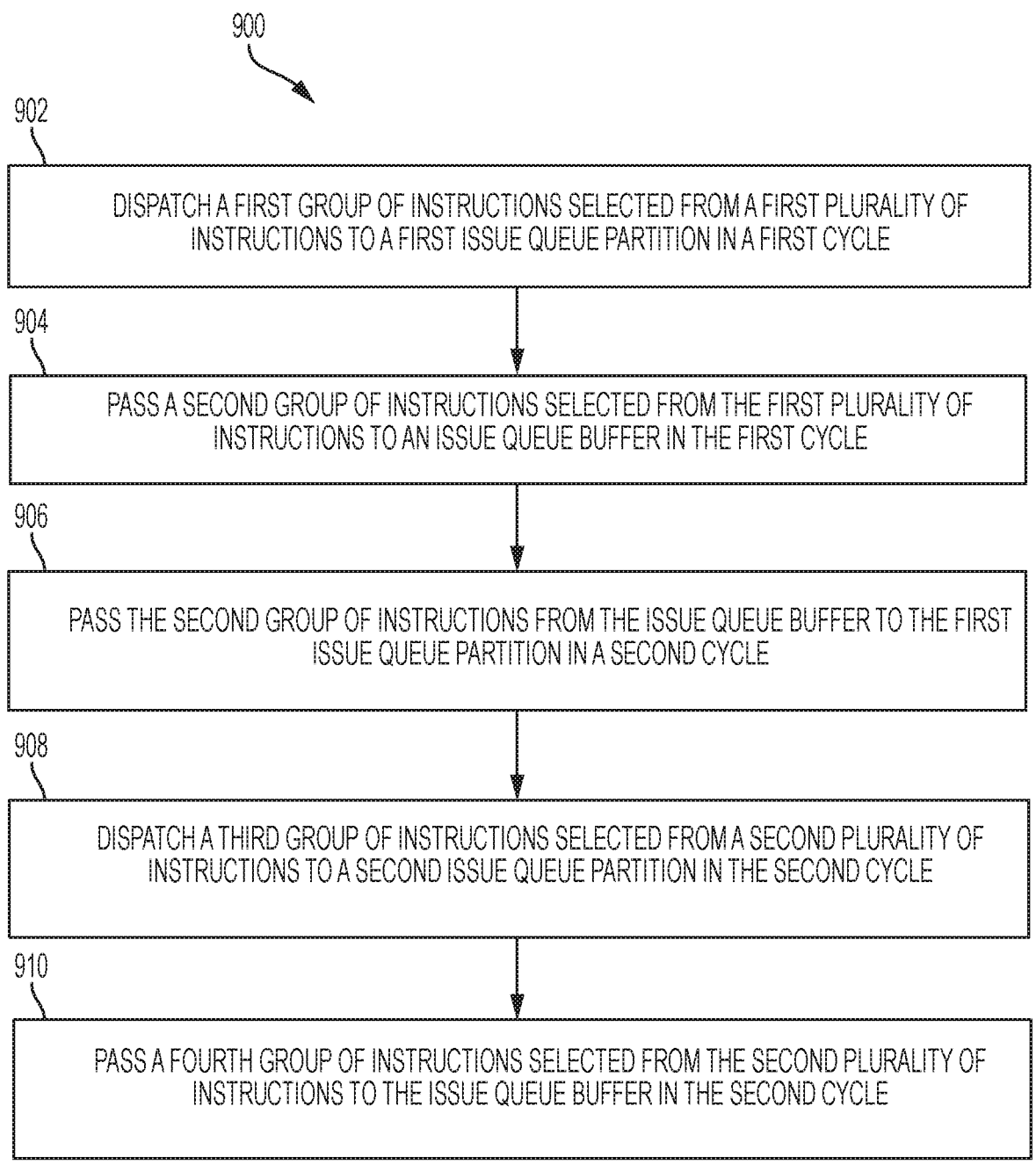
FIG. 9 depicts a process for buffered instruction dispatching to an issue queue in accordance with one or more embodiments of the present invention.

Turning now to FIG. 9, a flow diagram of a process 900 for buffered instruction dispatching to an issue queue is generally shown in accordance with an embodiment of the present invention. The process 900 is described with reference to FIGS. 1-8 and may include additional steps beyond those depicted in FIG. 9. The process 900 can be controlled by a controller, such as controller 316, 416 of FIGS. 3 and 4 within an OoO processor as embodiments of system 100 of FIG. 1. The example described herein is in reference to two issue queue partitions and corresponding multiplexers as described in reference to FIG. 3 and can be extended to any number of issue queue partitions.

At block 902, a dispatch unit 314, 414 dispatches a first group of instructions selected from a first plurality of instructions to a first issue queue partition 320, 420 of the processor in a first cycle. At block 904, a second group of instructions selected from the first plurality of instructions is passed to an issue queue buffer 304, 404A-C of the processor in the first cycle. At block 906, the second group of instructions from is passed the issue queue buffer 304, 404A-C to the first issue queue partition 320, 420 in a second cycle. At block 908, a third group of instructions selected from a second plurality of instructions is dispatched to a second issue queue partition 321, 421 in the second cycle. The second plurality of instructions can replace the first plurality of instructions in the dispatch unit 314, 414, such as a new set of six instructions in dispatch unit 314 or eight instructions in dispatch unit 414. At block 910, a fourth group of instructions selected from the second plurality of instructions is passed to the issue queue buffer 304, 404A-C in the second cycle.

A first multiplexer 310, 410 can select between the dispatch unit 314, 414 or the issue queue buffer 304, 404A-C to write to the first issue queue partition 320, 420. A second multiplexer 311, 411 can select between the dispatch unit 314, 414 or the issue queue buffer 304, 404A-C to write to the second issue queue partition 321, 421, where a selection at the first multiplexer 310, 410 differs from the selection at the second multiplexer 311, 411. A number of write ports in the first issue queue partition 320, 420 is less than a capacity of the dispatch unit 314, 414 to hold the first group of instructions, and the number of write ports in the second issue queue partition 321, 421 is less than the capacity of the dispatch unit 314, 414 to hold the second group of instructions. As described in reference to FIG. 4, there can be a plurality of issue queue buffers 404A-C and a plurality of issue queue partitions 420-423, where a number of issue queue partitions 420-423 is greater than a number of issue queue buffers 404A-C (e.g., four issue queue partitions and three issue queue buffers). Further, the first issue queue partition 320, 420 and the second issue queue partition 321, 421 can each be associated with different threads.

Figure 10:
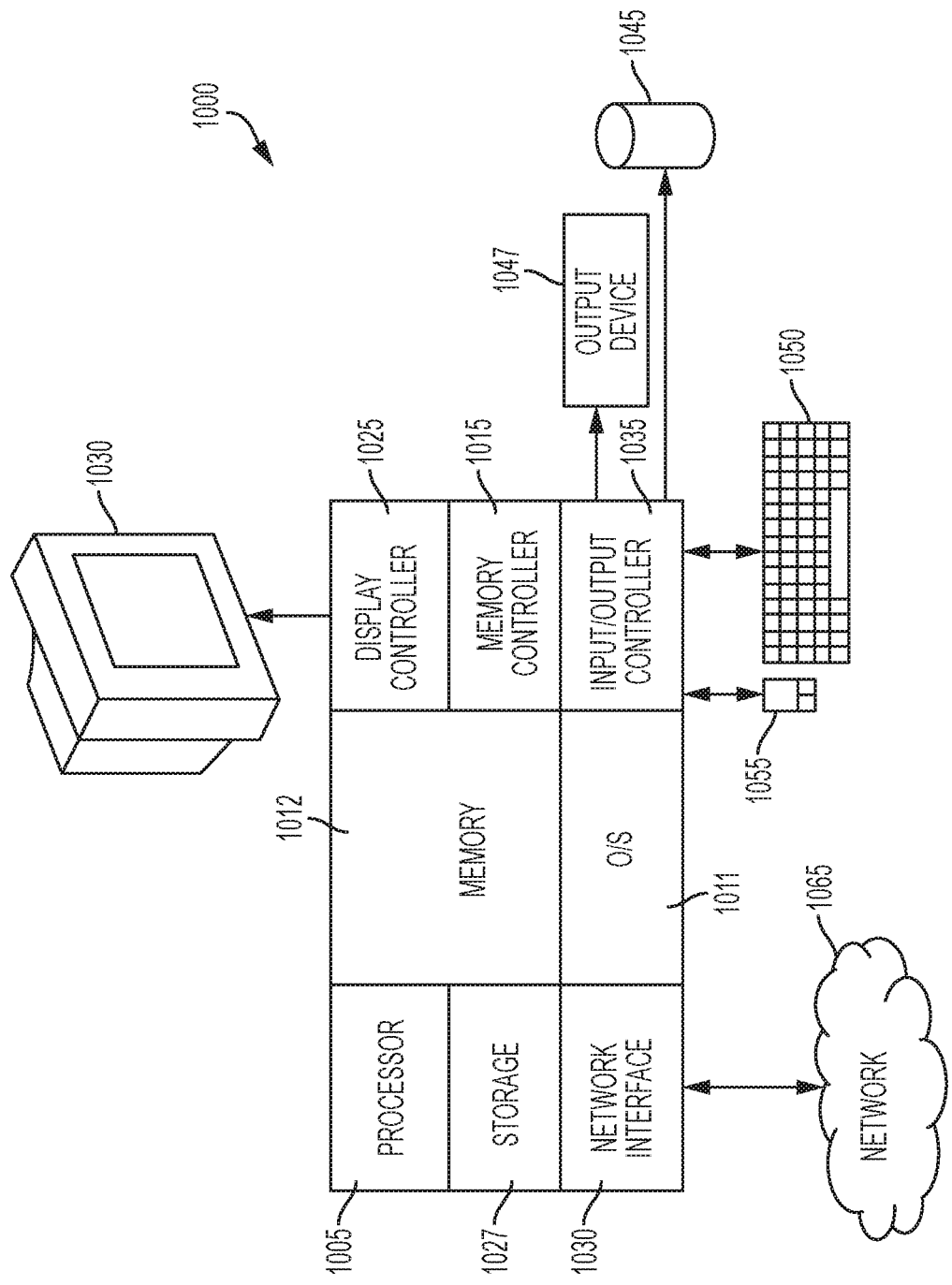
FIG. 10 depicts a block diagram of a computer system for implementing some or all aspects of buffered instruction dispatching to an issue queue in accordance with one or more embodiments of the present invention.

Turning now to FIG. 10, a block diagram of a computer system 1000 for implementing some or all aspects of buffered instruction dispatching to an issue queue of an OoO processor is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1000, such as a mobile device, personal computer, workstation, minicomputer, or mainframe computer.

In an exemplary embodiment, as shown in FIG. 10, the computer system 1000 includes a processor 1005, memory 1012 coupled to a memory controller 1015, and one or more input devices 1045 and/or output devices 1047, such as peripherals, that are communicatively coupled via a local I/O controller 1035. These devices 1045 and 1047 may include, for example, a printer, a scanner, a microphone, and the like. A conventional keyboard 1050 and mouse 1055 may be coupled to the I/O controller 1035. The I/O controller 1035 may be, for example, one or more buses or other wired or wireless connections, as are known in the art. The I/O controller 1035 may have additional elements, which are omitted for simplicity, such as controllers, buffers (caches), drivers, repeaters, and receivers, to enable communications.

The I/O devices 1045, 1047 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1005 is a hardware device for executing hardware instructions or software, particularly those stored in memory 1012. The processor 1005 may be a custom made or commercially available processor, a central processing unit (CPU), an auxiliary processor among several processors associated with the computer system 1000, a semiconductor based microprocessor (in the form of a microchip or chip set), a macroprocessor, or other device for executing instructions. The processor 1005 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1012 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1012 may incorporate electronic, magnetic, optical, or other types of storage media. Note that the memory 1012 may have a distributed architecture, where various components are situated remote from one another but may be accessed by the processor 1005.

The instructions in memory 1012 may include one or more separate programs, each of which comprises an ordered listing of executable instructions for implementing logical functions. In the example of FIG. 10, the instructions in the memory 1012 include a suitable operating system (OS) 1011. The operating system 1011 essentially may control the execution of other computer programs and provides scheduling, input-output control, file and data management, memory management, and communication control and related services.

Additional data, including, for example, instructions for the processor 1005 or other retrievable information, may be stored in storage 1027, which may be a storage device such as a hard disk drive or solid state drive. The stored instructions in memory 1012 or in storage 1027 may include those enabling the processor to execute one or more aspects of the dispatch systems and methods of this disclosure.

The computer system 1000 may further include a display controller 1025 coupled to a display 1030. In an exemplary embodiment, the computer system 1000 may further include a network interface 1060 for coupling to a network 1065. The network 1065 may be an IP-based network for communication between the computer system 1000 and an external server, client and the like via a broadband connection. The network 1065 transmits and receives data between the computer system 1000 and external systems. In an exemplary embodiment, the network 1065 may be a managed IP network administered by a service provider. The network 1065 may be implemented in a wireless fashion, e.g., using wireless protocols and technologies, such as WiFi, WiMax, etc. The network 1065 may also be a packet-switched network such as a local area network, wide area network, metropolitan area network, the Internet, or other similar type of network environment. The network 1065 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing buffered instruction dispatching to an issue queue as described herein can be embodied, in whole or in part, in computer program products or in computer systems 1000, such as that illustrated in FIG. 10.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   dispatching from a dispatch unit of a processor a first group of instructions selected from a first plurality of instructions to a first issue queue partition of the processor in a first cycle;
   passing a second group of instructions selected from the first plurality of instructions to an issue queue buffer of the processor in the first cycle;
   passing the second group of instructions from the issue queue buffer to the first issue queue partition in a second cycle; and
   dispatching a third group of instructions selected from a second plurality of instructions to a second issue queue partition in the second cycle, wherein a number of write ports in the first issue queue partition is less than a capacity of the dispatch unit to hold the first group of instructions, the number of write ports in the second issue queue partition is less than the capacity of the dispatch unit to hold the second group of instructions, a capacity of the issue queue buffer is less than the capacity of the dispatch unit, and the instructions are written to the issue queue buffer in response to detecting that the number of dispatched instructions for a thread is greater than the number of write ports on an issue queue partition.

2. The computer-implemented method of claim 1, further comprising passing a fourth group of instructions selected from the second plurality of instructions to the issue queue buffer in the second cycle.

3. The computer-implemented method of claim 1, wherein the second plurality of instructions replaces the first plurality of instructions in the dispatch unit.

4. The computer-implemented method of claim 1, further comprising:
   selecting, at a first multiplexer, the dispatch unit or the issue queue buffer to write to the first issue queue partition; and
   selecting, at a second multiplexer, the dispatch unit or the issue queue buffer to write to the second issue queue partition, wherein a selection at the first multiplexer differs from the selection at the second multiplexer.

5. The computer-implemented method of claim 1, further comprising a plurality of issue queue buffers and a plurality of issue queue partitions, wherein a number of issue queue partitions is greater than a number of issue queue buffers.

6. The computer-implemented method of claim 1, wherein the first issue queue partition and the second issue queue partition are each associated with different threads.

7. A system comprising:
   a dispatching unit of a processor;
   an issue queue buffer of the processor;
   a first issue queue partition of the processor;

a second issue queue partition of the processor; and a controller of the processor to perform a plurality of operations comprising:

dispatching from the dispatch unit a first group of instructions selected from a first plurality of instructions to the first issue queue partition in a first cycle;

passing a second group of instructions selected from the first plurality of instructions to the issue queue buffer of the processor in the first cycle;

passing the second group of instructions from the issue queue buffer to the first issue queue partition in a second cycle; and dispatching a third group of instructions selected from a second plurality of instructions to the second issue queue partition in the second cycle, wherein a number of write ports in the first issue queue partition is less than a capacity of the dispatch unit to hold the first group of instructions, the number of write ports in the second issue queue partition is less than the capacity of the dispatch unit to hold the second group of instructions, a capacity of the issue queue buffer is less than the capacity of the dispatch unit, and the instructions are written to the issue queue buffer in response to detecting that the number of dispatched instructions for a thread is greater than the number of write ports on an issue queue partition.

8. The system of claim 7, wherein a fourth group of instructions selected from the second plurality of instructions is passed to the issue queue buffer in the second cycle.

9. The system of claim 7, wherein the second plurality of instructions replaces the first plurality of instructions in the dispatch unit.

10. The system of claim 7, further comprising a first multiplexer and a second multiplexer, wherein the first multiplexer selects the dispatch unit or the issue queue buffer to write to the first issue queue partition, and the second multiplexer selects the dispatch unit or the issue queue buffer to write to the second issue queue partition, wherein a selection at the first multiplexer differs from the selection at the second multiplexer.

11. The system of claim 7, further comprising a plurality of issue queue buffers and a plurality of issue queue partitions, wherein a number of issue queue partitions is greater than a number of issue queue buffers.

12. The system of claim 7, wherein the first issue queue partition and the second issue queue partition are each associated with different threads.

13. A computer program product comprising a non-transitory computer readable storage medium having program instructions embodied therewith, the program instructions executable by a processor to cause the processor to perform operations comprising:

dispatching from a dispatch unit of the processor a first group of instructions selected from a first plurality of instructions to a first issue queue partition of the processor in a first cycle;

passing a second group of instructions selected from the first plurality of instructions to an issue queue buffer of the processor in the first cycle;

passing the second group of instructions from the issue queue buffer to the first issue queue partition in a second cycle; and dispatching a third group of instructions selected from a second plurality of instructions to a second issue queue partition in the second cycle, wherein a number of write ports in the first issue queue partition is less than a capacity of the dispatch unit to hold the first group of instructions, the number of write ports in the second issue queue partition is less than the capacity of the dispatch unit to hold the second group of instructions, a capacity of the issue queue buffer is less than the capacity of the dispatch unit, and the instructions are written to the issue queue buffer in response to detecting that the number of dispatched instructions for a thread is greater than the number of write ports on an issue queue partition.

14. The computer program product of claim 13, wherein the program instructions executable by the processor to cause the processor to perform operations comprising:

passing a fourth group of instructions selected from the second plurality of instructions to the issue queue buffer in the second cycle.

15. The computer program product of claim 13, wherein the second plurality of instructions replaces the first plurality of instructions in the dispatch unit.

16. The computer program product of claim 13, wherein the program instructions executable by the processor further cause the processor to perform operations comprising:

selecting, at a first multiplexer, the dispatch unit or the issue queue buffer to write to the first issue queue partition; and selecting, at a second multiplexer, the dispatch unit or the issue queue buffer to write to the second issue queue partition, wherein a selection at the first multiplexer differs from the selection at the second multiplexer.

17. The computer program product of claim 13, wherein the first issue queue partition and the second issue queue partition are each associated with different threads.

* * * * *